(12) United States Patent
Muller et al.

(10) Patent No.: US 10,773,756 B2
(45) Date of Patent: Sep. 15, 2020

(54) STRUCTURAL COMPONENT OF A MOTOR VEHICLE SHELL

(71) Applicant: CONSTELLIUM NEUF-BRISACH, Biesheim (FR)

(72) Inventors: Estelle Muller, Grenoble (FR); Olivier Rebuffet, Grenoble (FR); Guillaume Delgrange, Grenoble (FR)

(73) Assignee: CONSTELLIUM NEUF-BRISACH, Biesheim (FR)

( * ) Notice: Subject to any disclaimer, the term of this patent is extended or adjusted under 35 U.S.C. 154(b) by 274 days.

(21) Appl. No.: 15/767,162

(22) PCT Filed: Oct. 6, 2016

(86) PCT No.: PCT/FR2016/052577
§ 371 (c)(1),
(2) Date: Apr. 10, 2018

(87) PCT Pub. No.: WO2017/064396
PCT Pub. Date: Apr. 20, 2017

(65) Prior Publication Data
US 2019/0071133 A1    Mar. 7, 2019

(30) Foreign Application Priority Data
Oct. 12, 2015    (FR) ...................................... 15 59674

(51) Int. Cl.
*B62D 29/00* (2006.01)
*B32B 15/01* (2006.01)
(Continued)

(52) U.S. Cl.
CPC .......... *B62D 29/008* (2013.01); *B32B 15/016* (2013.01); *B62D 29/00* (2013.01);
(Continued)

(58) Field of Classification Search
CPC .... B62D 29/008; B62D 29/00; B32B 15/016; C22C 21/02; C22F 1/043; C22F 1/05
See application file for complete search history.

(56) References Cited

U.S. PATENT DOCUMENTS 10,513,767 B2 * 12/2019 Meyer ...................... C21D 9/56
2005/0086784 A1 * 4/2005 Li ............................. B21K 1/26
29/421.1

FOREIGN PATENT DOCUMENTS

EP    2581218 A1    4/2013
FR    2826979 A1    1/2003
(Continued)

OTHER PUBLICATIONS

Mike Murphy, "Aluminum Growth in Auto Body Today to 2020," Retrieved from the Internet: URL: http://www.drivealuminum.org/research-resources/PDF/Speeches%20and%20Presentations/2012/Aluminum-Growth-in-Auto-Body-Today-to-2020-Murphy.pdf, Retrieved on Apr. 7, 2014, Oct. 24, 2012, pp. 1-11, XP002722930.
(Continued)

Primary Examiner — Joseph D. Pape
(74) Attorney, Agent, or Firm — McBee Moore & Vanik IP, LLC

(57) ABSTRACT

The invention relates to a method for manufacturing a stamped motor vehicle bodywork or shell-structure component made of an aluminium alloy, comprising the steps of manufacturing a metal sheet or strip with a thickness of 0 to 3.5 mm made of an alloy with the following composition (wt %): Si: 0.60-0.85; Fe: 0.05-0.25; Cu: 0.05-0.30; Mn: 0.05-0.30; Mg: 0.50-0.00; Ti: 0.02-0.15; V: 0.00-0.15; other elements <0.05 each and <0.15 in total, remainder aluminium, with Mg<−2.67×Si+2.87, solution heat treating and quenching, pre-tempering, ageing for 72 hours to 6 months, stamping, tempering at a temperature of around 205° C. with a dwell time of 180 to 480 minutes or tempering at an
(Continued)

equivalent time and temperature, painting and "bake hardening" at a temperature of 150 to 190° C. for 15 to 30 min. The invention also relates to a stamped motor vehicle bodywork or shell-structure component, further referred to as "body in white" produced by such a method.

20 Claims, 2 Drawing Sheets

(51) Int. Cl.
  *C22C 21/02* (2006.01)
  *C22F 1/043* (2006.01)
  *C22F 1/05* (2006.01)

(52) U.S. Cl.
  CPC .............. *C22C 21/02* (2013.01); *C22F 1/043* (2013.01); *C22F 1/05* (2013.01)

(56) References Cited

FOREIGN PATENT DOCUMENTS

| | | | |
|---|---|---|---|
| JP | H02122055 | A | 5/1990 |
| JP | H11343547 | A | 12/1999 |
| JP | 2001262264 | A | 9/2001 |
| JP | 2014087837 | A | 5/2014 |
| WO | 2013/121876 | A1 | 8/2013 |

OTHER PUBLICATIONS

International Search Report of International Patent Application No. PCT/FR2016/052577 dated Nov. 24, 2016.

\* cited by examiner

STRUCTURAL COMPONENT OF A MOTOR VEHICLE SHELL

CROSS REFERENCE TO RELATED APPLICATIONS

This application is a National Stage entry of International Application No. PCT/FR2016/052577 filed Oct. 6, 2016, which claims priority to France Patent Application No. 1559674, filed Oct. 12, 2015.

BACKGROUND

Field

The invention relates to the field of parts or components of automobile structure also called "body in white", manufactured in particular by stamping aluminum alloy sheets, more particularly alloys of series AA6xxx as designated by the "Aluminum Association", designed to absorb energy irreversibly during an impact, and having an excellent compromise between high mechanical strength and good "crash" behavior, such as shock absorbers or "crashboxes", reinforcing parts, lining parts, or other body structural components.
More specifically, the invention relates to the manufacture of such components by stamping in a solution-hardened, quenched and naturally aged temper followed by artificial aging of the workpiece and bake hardening.

Description of Related Art

As a preamble, all aluminum alloys mentioned herein are identified, unless otherwise indicated, according to the designations defined by the "Aluminum Association" in the "Registration Record Series" that it publishes regularly.
All indications concerning the chemical composition of the alloys are expressed as a percentage by weight based on the total weight of the alloy.
The expression 1.4×Si means that the silicon content, expressed as a percentage by weight is multiplied by 1.4.
Definitions of the tempers are given in European standard EN 515.
The tensile static mechanical properties, in other words the ultimate tensile strength $R_m$, the conventional tensile yield strength at 0.2% offset ($R_{p0.2}$) and elongation at break A %, are determined by a tensile test according to standard EN ISO 6892-1.
The folding angles, called alpha norm, are determined by 3-point fold testing according to standard NF EN ISO 7438 and procedures VDA 238-100 and VDA 239-200.

Aluminum alloys are increasingly used in the automotive industry to reduce vehicle weight and reduce fuel consumption and greenhouse gas emissions.
Aluminum alloy sheets are used in particular for the production of many components of the "body in white" among which are bodywork skin parts (or exterior body panels) such as front fenders, roofs or pavilions, skins for hoods, trunks or doors, and lining parts or body structure components such as liners or reinforcements for doors, hoods, trunk lids, pavilions, or spars, walls, load floors, tunnels and front, middle and rear feet, and finally shock absorbers or "crashboxes".
While many skin components are already made from aluminum alloy sheets, the move from steel to aluminum for lining or structural parts with complex geometries proves to be trickier. Firstly because of the poorer formability of aluminum alloys compared with steels and secondly because of the mechanical properties which are generally lower than those of the steels used for this type of component.
This is because this type of application requires a set of sometimes conflicting properties, such as:

a high formability in the delivery temper, temper T4, in particular for stamping operations, a controlled tensile yield strength at delivery condition of the sheet to master springback when shaping, a good behavior in various assembly processes used in automobile body components such as spot welding, laser welding, adhesive bonding, clinching or riveting, high strength after cataphoresis and paint baking to obtain good mechanical strength in service while minimizing the weight of the part, good ability to absorb energy upon impact for application to body structural components, good resistance to corrosion, including intergranular corrosion, stress corrosion and filiform corrosion of the finished part, compatibility with the requirements of recycling manufacturing waste or recycled vehicles, an acceptable cost for mass production.

However, there is already mass production for automobiles with a body in white consisting mainly of aluminum alloys. For example the Ford F-150 model, 2014 version, is made of the structural alloy AA6111. This alloy was developed by the "Alcan" group between 1980 and 1990. Two references describe this development work:

P. E. Fortin et al, "An optimized Al alloy for Auto body sheet applications", SAE technical conference, March 1984 describes the following composition:

| [Fortin] | Si | Fe | Cu | Mn | Mg | Cr | Zn | Ti |
|---|---|---|---|---|---|---|---|---|
| AA6111 | 0.85 | 0.20 | 0.75 | 0.20 | 0.72 | — | — | — |

M. J. Bull et al, "Al sheet alloys for structural and skin applications", 25th ISATA symposium, Paper 920669, June 1992:

The main property remains high mechanical strength, even if it is initially intended to withstand indentation for skin-type applications: "A yield-strength of 280 MPa is achieved after 2% pre-strain and 30 min at 177° C.".

In addition, other alloys of the AA6xxx family with high mechanical properties have been developed for aeronautical or automobile applications. For example, the AA6056 type alloy, which was developed in the 1980s at "Pechiney" has undergone numerous studies and appeared in numerous publications, either to optimize the mechanical properties, or to improve resistance to intergranular corrosion. We note the automobile application of this type of alloy, which was the subject of patent application (WO2004113579A1).

Alloys of type AA6013 have also been the subject of many studies. For example, at "Alcoa", in application US2002039664 published in 2002, an alloy comprising 0.6-1.15% Si; 0.6-1% Cu; 0.8-1.2% Mg; 0.55-0.86% Zn; less than 0.1% Mn; 0.2-0.3% Cr and about 0.2% Fe, used in temper T6, combines good resistance to intergranular corrosion, together with an $R_{p0.2}$ of 380 MPa.

At "Aleris", an application published in 2003, WO03006697, relates to an alloy of the AA6xxx series with 0.2 to 0.45% Cu. The purpose of the invention is to propose an alloy of the AA6013 type with a reduced Cu level, targeting 355 MPa of Rm in temper T6 and good resistance to intergranular corrosion. The claimed composition is as follows: 0.8-1.3% Si; 0.2-0.45% Cu; 0.5-1.1% Mn; 0.45-1.0% Mg.

Finally, it should be noted that in most of the above examples, high mechanical properties ($Rp_{0.2}$, Rm) are obtained by using alloys containing at least 0.5% copper. Moreover, structural parts for automobile applications made of alloy 7xxx are known, as described for example in application EP 2 581 218.

In addition, to produce aluminum alloy parts of complex geometry, such as a door liner, that cannot be done by conventional stamping with the aforementioned alloys, various solutions have been considered and/or used in the past:

Getting round the difficulty related to stamping by producing this type of part by molding, especially the "under-pressure" type. Evidence of this is patent EP 1 305 179 B1 by Nothelfer GmbH with priority of 2000.

Performing so-called "warm" stamping to obtain better stamping ability. This consists of heating the aluminum alloy blank, totally or locally at a so-called intermediate temperature, i.e. from 150 to 350° C., to improve its behavior under the press, the tooling of which can also be preheated. Patent EP 1 601 478 B1 by the applicant, with priority of 2003, is based on this solution.

Modifying, through its composition, the stamping ability of the AA5xxx series alloy itself; it has been proposed in particular to increase the magnesium content above 5%. But this is not without impact in terms of corrosion resistance.

Using composite sheets consisting of an alloy core of the AA5xxx series, with an Mg content above 5% for better formability, and an alloy clad sheet that is more resistant to corrosion. But corrosion resistance at the edges of the sheet, in the punched areas or more generally where the core is exposed, and in particular in assemblies, may then be insufficient.

Finally, asymmetric rolling to create a more favorable crystallographic texture has also been proposed. As evidenced by application JP 2003-305503 by Mitsubishi Aluminum). But the industrialization of this type of asymmetric rolling is tricky, requires special rolling mills, can have an adverse impact on the surface appearance of the sheets obtained, and can also generate significant additional costs.

Considering the growing development of the use of aluminum alloy sheets for automobile body components and long production runs, there is always a demand for ever improved grades to reduce thicknesses without impairing the other properties so as to always increase lightweighting. Obviously, this development involves the use of alloys of increasingly high tensile yield strengths, and the solution involving using the AA6xxx series of ever more resistant alloys, shaped in temper T4, i.e. after solution heat treatment and quenching, hardening greatly during the operations of pre-aging and baking of paints and varnishes, is reaching its limits. It leads to increasingly hard alloys in temper T4 which, as a result, pose serious forming problems.

Problem

The aim of the invention is to obtain an excellent compromise between formability in temper T4 and high mechanical strength, as well as good riveting and crash-resistant behavior of the finished component, by proposing a method of manufacturing such components by forming them in temper T4 after natural aging at room temperature, followed by hardening by artificial aging on formed workpieces and bake hardening.

These components must also have a very good resistance to corrosion and perform well in the various assembly methods such as spot welding, laser welding, adhesive bonding, clinching or riveting.

SUMMARY

The subject of the invention is a method for manufacturing a formed, particularly a stamped component, for bodywork or body structure, also called a "body in white" made of aluminum alloy, comprising the following steps:

Manufacture of a sheet or strip of thickness between 1 and 3.5 mm of an alloy with composition (as a percentage by weight):

Si: 0.60-0.85; Fe: 0.05-0.25; Cu: 0.05-0.30; Mn: 0.05-0.30; Mg: 0.50-1.00; Ti: 0.02-0.15; V: 0.00-0.15 other elements <0.05 each and <0.15 in total, the rest aluminum, with Mg<−2.67×Si+2.87, Solution heat treatment, quenching and possible pre-aging at a temperature generally between 50 and 100° C. for a period of at least 12 hours, typically obtained by coiling at a temperature of at least 60° C. followed cooling in the open air, Natural aging at room temperature typically between 72 hours and 6 months, Forming, in particular by press stamping, to obtain a three-dimensional part, Aging the workpiece at a temperature of substantially 205° C. with a holding time of between 180 and 480 minutes, and preferably between 240 and 480 minutes, or time-temperature equivalent aging, Painting and bake hardening at a temperature of 150 to 190° C. and preferably 170 to 190° C. for 15 to 30 min. The term "three-dimensional part" means a part for which there is no direction in which the transverse section of said part is constant along said direction.

According to an advantageous embodiment, the component obtained by the above process has, after natural aging, artificial aging and bake hardening, a tensile yield strength $Rp_{0.2}$ determined according to standard NF EN ISO 6892-1, of at least 260 MPa and/or a "three point folding angle" αnorm, measured according to standard NF EN ISO 7438 and procedures VDA 238-100 and VDA 239-200, of at least 90° and preferably of at least 100°.

Finally, the invention also encompasses a stamped bodywork component or automotive bodywork structure also called "body in white" such as in particular lining or reinforcement for a door, hood, trunk lid, roof, or spars, walls, load floors, tunnels and front, middle and rear feet or uprights, as well as shock absorbers or "crashboxes".

DETAILED DESCRIPTION OF A PREFERRED EMBODIMENT

Figure 1:
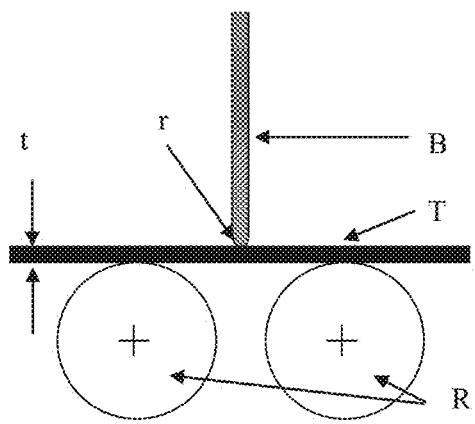
FIG. 1 shows the device for the "three-point fold test" consisting of two rollers R and a punch B with radius r to fold the sheet T of thickness t.

The invention is based on the observation made by the applicant that it is perfectly possible, using a suitable composition and a manufacturing process, to obtain sheets having excellent stampability after solution heat treatment, quenching. and natural aging at ambient temperature, and sufficient mechanical strength in the artificially aged temper and after bake hardening, typically for 4 hours and 20 minutes at 205° C. and 180° C. respectively, while guaranteeing very satisfactory rivetability and crash behavior for the finished component. The mechanical properties obtained in this last temper are tensile yield strength $Rp_{0.2} \geq 260$ MPa, ultimate tensile strength $Rm \geq 290$ MPa, an elongation at break $A_{80} \geq 10\%$, and a folding angle αnorm without cracking $\geq 90°$ and preferably $\geq 100°$.

The composition of the alloy according to the invention is the following (as percentages by weight): Si: 0.60-0.85; Fe: 0.05-0.25; Cu: 0.05-0.30; Mn: 0.05-0.30; Mg: 0.50-1.00; Ti: 0.02-0.15; V: 0.00-0.15 other elements <0.05 each and <0.15 in total, the rest aluminum, with $Mg < -2.67 \times Si + 2.87$, The concentration ranges imposed on the components of this type of alloy are explained by the following reasons:

Si: Silicon is, along with magnesium, the first alloying element of aluminum-magnesium-silicon systems (AA6xxx family) to form intermetallic $Mg_2Si$ or $Mg_5Si_6$ compounds which contribute to the age hardening of these alloys. The presence of silicon at a content of between 0.60% and 0.85%, combined with that of magnesium, at a content of between 0.50% and 1.00%, with $Mg < 2.67 \times Si + 2.87$, makes it possible to obtain the Si/Mg ratio required to obtain the desired mechanical properties while guaranteeing good corrosion resistance and satisfactory forming ability by stamping at ambient temperature. This is because if $Mg > -2.67 \times Si + 2.87$ for the silicon and magnesium contents according to the invention, the alloys cannot generally be solution hardened, which will be detrimental to the compromise sought. The range of the most advantageous content for silicon is from 0.60 to 0.75%.

Mg: Generally, the level of mechanical properties of AA6xxx family alloys increases with the magnesium content. Combined with silicon to form intermetallic $Mg_2Si$ or $Mg_5Si_6$, compounds, magnesium contributes to increasing the mechanical properties. A minimum content of 0.50% is required to obtain the required level of mechanical properties and to form enough hardening precipitates. Beyond 1.00%, the Si/Mg ratio obtained is unfavorable to the compromise of properties sought.

The range of the most advantageous content for magnesium is from 0.60 to 0.70%.

Fe: Iron is generally considered an undesirable impurity; the presence of intermetallic compounds containing iron is generally associated with a decrease in formability. Surprisingly, the present inventors found that a content in excess of 0.05%, and better still 0.10%, improves ductility and formability, in particular by retarding rupture during deformation after reduction in area. Although they are not committed to this hypothesis, the present inventors believe that this surprising effect could in particular arise from the substantial decrease in the solubility of manganese in solid solution when this element is present and/or the formation of a high density of intermetallic particles guaranteeing good "hardenability" during forming. In these contents iron may also contribute to controlling grain size. Beyond a content of 0.25%, too many intermetallic particles are created with a detrimental effect on ductility and corrosion resistance.

The range of the most advantageous content is from 0.05 to 0.20%.

Mn: its content is limited to 0.30%. An addition of manganese above 0.05% increases the mechanical properties by the solid solution strengthening effect, but beyond 0.30%, it would greatly decrease sensitivity to the rate of deformation and therefore ductility.

The range of the most advantageous content for manganese is from 0.10 to 0.15%.

Cu: In AA6000 family alloys, copper is an effective hardener by taking part in hardening precipitation. At a minimum content of 0.05%, its presence makes it possible to obtain higher mechanical properties. In the alloy under consideration, copper above 0.30% has a negative influence on resistance to intergranular corrosion. Preferably, the copper content is at most 0.20%.

The range of the most advantageous content for copper is from 0.08 to 0.15%.

V and Ti: each of these elements, for Ti at a content of at least 0.02%, can promote solid solution hardening leading to the required mechanical properties and each of these elements has a favorable effect on ductility in service and corrosion resistance. However, a maximum content of 0.15% for Ti, as for V, is required to avoid the conditions of formation of primary phases during vertical casting, which have a detrimental effect on all the claimed properties. The range of the most advantageous content is from 0.03 to 0.10% for Ti and 0.05 to 0.10% for V.

Other elements are typically impurities whose content is kept below 0.05%; the rest is aluminum. Among the impurities Cr, Ni, Zn, Zr and Pb may for example be mentioned. Preferably, some impurities are kept at even lower levels. The Ni and Zr content is advantageously kept below 0.03% and the Pb content is advantageously kept below 0.02%.

The method of manufacturing the sheets according to the invention typically comprises casting a rolling ingot, scalping this rolling ingot, followed by homogenizing, advantageously with a rate of temperature increase of at least 30° C./h to a temperature of 530 to 570° C., holding between 2 and 12 h, preferably between 4 and 6 h, followed by cooling, either down to room temperature, or down to the starting temperature for hot rolling.

After reheating in the case of cooling down to ambient temperature after homogenizing, the next phase is hot rolling the rolling ingot into a strip of thickness between 3.5 and 10 mm, cold rolling to final thickness, typically between 1 and 3.5 mm, solution heat treating the rolled strip at a temperature above the alloy solvus temperature, while avoiding local melting or incipient melting, or between 540 and 570° C. for 10 s to 30 min, quenching at a rate of more than 30° C./sec and more preferably at least 100° C./sec.

The next step may be pre-aging, i.e. a treatment at a temperature between 50 and 100° C. for a period of at least 12 hours, typically obtained by coiling at a temperature of at least 60° C. followed by cooling in open air, then natural aging at room temperature for 72 h to 6 months.

In this way, the sheets according to the invention have very good stampability.

The sheets then undergo the following operations:
  Forming, in particular by press stamping, to obtain a three-dimensional part,
  Thermal treatment at a temperature of substantially 205° C. with a holding time of between 180 and 480 minutes, and preferably between 240 and 480 minutes, or teq-Teq time-temperature equivalent aging, according to the equation, $$\int_0^t \exp\left(\frac{-Q}{RT}\right)dt = \int_0^{teq} \exp\left(\frac{-Q}{RTeq}\right)dt$$

where Q is substantially 82915 J, where T is the instantaneous temperature expressed in Kelvin which changes with time t, and $T_{eq}$ is the reference temperature of 205° C. (478 K), and teq is the equivalent time.

Preferably aging is carried out at a temperature between 160° C. and 220° C. and preferably between 200° C. and 210° C. with a holding time of between 60 and 640 minutes, the equivalent time for a reference temperature $T_{eq}$=205° C. being between 180 and 480 minutes and preferably between 240 and 480 minutes.

Painting and bake hardening at a temperature of 150 to 190° C. and preferably 170 to 190° C. for 15 to 30 min.

The components produced in this way have, when in use, after forming, optimized workpiece aging, assembly and bake hardening, high mechanical properties, very good crash behavior and good resistance to corrosion.

The details of the invention will be understood better with the help of the examples below, which are not however restrictive in their scope.

EXAMPLES

Preamble

Table 1 summarizes the nominal chemical compositions (as percentages by weight) of the alloys used in the tests. The content of the other elements was <0.05.

TABLE 1

| Composition | Si | Fe | Cu | Mn | Mg | Ti | V | −2.67 × Si + 2.87 |
|---|---|---|---|---|---|---|---|---|
| Invention 1 | 0.65 | 0.19 | 0.15 | 0.19 | 0.65 | 0.05 | 0.08 | 1.13 |
| Invention 2 | 0.63 | 0.15 | 0.15 | 0.20 | 0.65 | 0.05 | 0.08 | 1.19 |
| Invention 3 | 0.70 | 0.15 | 0.11 | 0.13 | 0.65 | 0.02 | — | 1.00 |
| Invention 31 | 0.62 | 0.23 | 0.18 | 0.17 | 0.63 | 0.03 | — | 1.21 |
| Invention 4 | 0.65 | 0.15 | 0.15 | 0.20 | 0.97 | 0.05 | 0.05 | 1.13 |
| Invention 5 | 0.71 | 0.15 | 0.15 | 0.20 | 0.71 | 0.02 | 0.01 | 0.97 |
| Invention 6 | 0.80 | 0.14 | 0.14 | 0.20 | 0.54 | 0.02 | — | 0.73 |
| Alloy 7 | 0.90 | 0.24 | 0.09 | 0.17 | 0.41 | 0.02 | — | 0.47 |
| Alloy 8 | 0.56 | 0.24 | 0.09 | 0.13 | 0.53 | 0.02 | — | 1.37 |
| Alloy 9 | 0.67 | 0.30 | 0.09 | 0.15 | 0.64 | 0.02 | — | 1.08 |
| Alloy 10 | 1.00 | 0.24 | 0.17 | 0.17 | 0.60 | 0.02 | — | 0.20 |

The rolling ingots of these different alloys were obtained by vertical semi-continuous casting. After scalping, these different rolling ingots underwent a homogenizing and/or reheating thermal treatment, the temperatures of which are given in Table 2.

The rolling ingots of composition 1, 2, 7 and 8 underwent a homogenizing treatment at 530° C. consisting of a temperature increase at a speed of 30° C./h up to 530° C. and were kept at this temperature for around 3 hours. This homogenizing step is directly followed by a hot rolling step.

The rolling ingots of composition 3, 31 and 9 underwent homogenizing treatment at 540° C. consisting of a temperature increase at a speed of 30° C./h up to 540° C. and were kept at this temperature for around 5 hours, directly followed by hot rolling.

The rolling ingots of composition 4, 5 and 6 underwent homogenizing consisting of a temperature increase to 570° C. and were kept at this temperature for at least 2 hours, directly followed by hot rolling.

The rolling ingot of composition 10 underwent homogenizing treatment at 550° C. consisting of a temperature increase at a speed of 30° C./h up to 550° C. and was kept at this temperature for around 4 hours. This homogenizing step is directly followed by a hot rolling step.

The next hot rolling step takes place on a reversing mill followed depending on the case by a hot tandem mill with 4 roll stands to a thickness of between 3.5 and 10 mm. The hot rolling output thicknesses of the tested cases are given in Table 2.

This is followed by a cold rolling step to obtain sheets of thicknesses between 2.0 and 2.5 mm. The cold rolling output thicknesses of the cases tested are given in Table 2 below.

The rolling steps are followed by solution heat treatment and quenching. The solution heat treatment is carried out at a temperature above the alloy solvus temperature, while avoiding incipient melting. The sheet having undergone solution heat treatment is then quenched at a minimum speed of 30° C./s.

In all cases, except for cases 2, 4, 5 and 6, this step is carried out in a continuous furnace by raising the temperature of the metal to the solution heat treatment temperature in less than about one minute, directly followed by quenching.

For cases 2, 4, 5 and 6, solution heat treatment is carried out in an air furnace, the sheet being inserted into a hot furnace, the solution heat treatment temperature reached in less than 20 minutes and this temperature maintained for 30 minutes. This solution heat treatment step is followed by quenching by immersion in water at 85° C.

Quenching is followed by pre-aging thermal treatment, intended to improve hardening performance when baking paints.

For all cases tested, except cases 2, 4, 5 and 6, this step is performed by coiling at a temperature of at least 60° C. followed by cooling in the open air. For cases 2, 4, 5 and 6, pre-aging is achieved by immersing and maintaining the sheets in water at 85° C. for 8 hours. In all cases, natural aging at temperature for at least 72 hours was then carried out.

TABLE 2

| Composition | Homogenizing | Output thickness LAC | Output thickness LAF |
|---|---|---|---|
| Invention 1 | 530° C. | 10 mm | 2.5 mm |
| Invention 2 | 530° C. | 10 mm | 2.5 mm |
| Invention 3 | 540° C. | 6.3 mm | 2.0 mm |
| Invention 31 | 540° C. | 4.3 mm | 2.5 mm |
| Invention 4 | 570° C. | 10 mm | 2.5 mm |
| Invention 5 | 570° C. | 10 mm | 2.5 mm |
| Invention 6 | 570° C. | 10 mm | 2.5 mm |
| Alloy 7 | 530° C. | 6.3 mm | 2.0 mm |
| Alloy 8 | 530° C. | 4.3 mm | 2.0 mm |
| Alloy 9 | 540° C. | 10 mm | 2.5 mm |
| Alloy 10 | 550° C. | 5.0 mm | 2.3 mm |

The steps of solution heat treatment, quenching, pre-aging and natural aging at room temperature for a minimum of 72 hours are followed by heat treatments, known as aging, as described in Table 3.

After aging, all the cases tested undergo thermal treatment simulating paint baking in air furnaces with the sheet inserted in a hot furnace and kept there for 20 min at 185° C.

TABLE 3

| Test number | Composition | Aging | Time [min] | Temperature [° C.] |
|---|---|---|---|---|
| 1 | Invention 1 | Aging E | 120 | 205 |
| 2 | Invention 1 | Invention B | 480 | 205 |
| 3 | Invention 1 | Aging F | 960 | 205 |
| 4 | Invention 2 | Invention A | 240 | 205 |
| 5 | Invention 3 | Invention A | 240 | 205 |
| 6 | Invention 4 | Invention A | 240 | 205 |
| 7 | Invention 5 | Invention A | 240 | 205 |
| 8 | Invention 6 | Invention A | 240 | 205 |
| 9 | Alloy 7 | Aging D | 60 | 205 |
| 10 | Alloy 7 | Invention B | 480 | 205 |
| 11 | Alloy 8 | Aging E | 120 | 205 |
| 12 | Alloy 8 | Invention A | 240 | 205 |
| 13 | Alloy 9 | Aging E | 120 | 205 |
| 14 | Alloy 9 | Aging F | 960 | 205 |
| 14 | Alloy 10 | Aging C | 30 | 205 |
| 16 | Alloy 10 | Aging G | 1920 | 205 |
| 17 | Invention 31 | Invention A | 240 | 205 |

Tensile Testing

Tensile tests at ambient temperature were carried out according to standard NF EN ISO 6892-1 with non-proportional test pieces, of widely used geometry for sheets, and corresponding to the type of test piece 2 of table B.1 of Annex B of said standard. These test pieces have in particular a width of 20 mm and a calibrated length of 120 mm.

The results of these tensile tests in terms of the 0.2% conventional tensile yield strength, $Rp_{0.2}$, measured on the sheets as manufactured under the conditions described in the previous paragraph, are given in Table 4 below.

Figure 3:
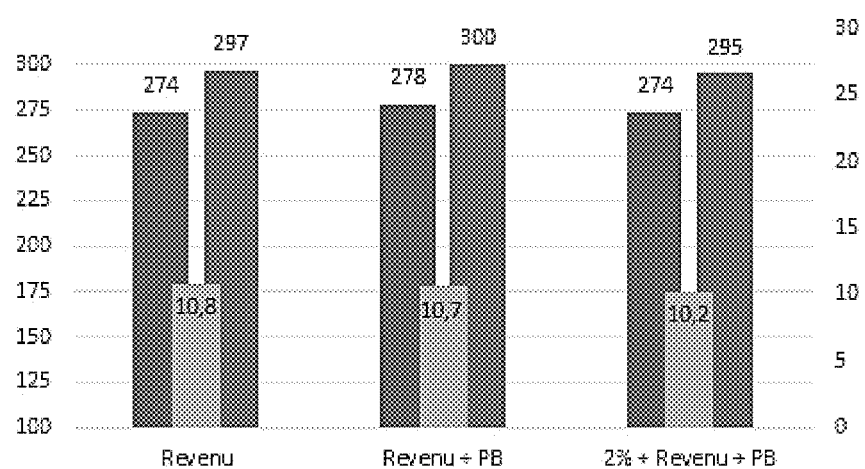
FIG. 3 shows the mechanical properties under stretching, with for each group of histograms, from left to right $Rp_{0.2}$ in MPa, A80 as a percentage, Rm in Mpa, for, still from left to right, sheets after aging treatment according to the invention (Aging), after aging+bake hardening (Aging+PB) and with tensile pre-strain of 2%, aging and bake hardening, paints (2%+Aging+PB).

For parts formed to T4 temper and then undergoing bake hardening, protocols recommend that a pre-strain by controlled stretching of 2% between natural aging and paint baking should be carried out, to simulate forming by stamping. In the case of artificial aging treatment after natural aging according to the invention, this pre-strain has no significant effect on the tensile characteristics of the final component, as shown in FIG. 3.

It can therefore be considered that the tensile characteristics of the sheets in the final temper are not significantly different from those of the finished stamped component.

Evaluation of Crash Behavior

Crash behavior can be estimated by a "three-point fold test" according to standard NF EN ISO 7438 and VDA 238-100 and VDA 239-200 procedures. The folding device is as shown in FIG. 1.

The "three-point fold" proper is made using a punch B of radius r=0.4 mm, the sheet being supported by two rollers R, the folding axis being parallel to the rolling direction. The rollers have a diameter of 30 mm and the distance between the roller axes is 30+2t mm, t being the thickness of the sheet T being tested.

At the beginning of the test the punch is brought into contact with the sheet with a strain of 30 Newtons. Once contact is established, the movement of the punch is indexed to zero. The test then involves moving the punch so as to perform the "three-point fold" of the sheet.

The test stops when micro-cracking of the sheet leads to a drop in force of the punch by at least 30 Newtons, or when the punch has moved 14.2 mm, which corresponds to the maximum permissible travel.

Figure 2:
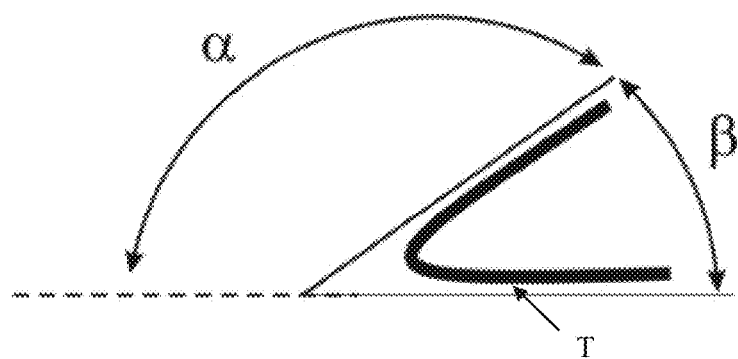
FIG. 2 shows sheet T after the "three-point fold" test with the internal angle β and the external angle, measured test result: α.

At the end of the test, the sample sheet is folded as shown in FIG. 2. Ductility in service is then evaluated by measuring the folding angle a. The higher the angle a, the better the sheet's ability to crash or to fold. In order to be able to compare the performances of all the cases tested, all the angles measured for different sheet thicknesses are converted to the αnorm value, according to the formula below as described in standard YDA 239-200:

$$\alpha_{norm} = \alpha_m \frac{\sqrt{t_m}}{t_{ref}}$$

with:
$\alpha_{norm}$: standard angle,
$\alpha_m$: measured angle,
$t_{ref}$: reference thickness,
$t_m$: measured thickness.

The results of these folding tests on the sheets as manufactured according to the conditions described in the "Preamble" paragraph, are given in Table 4 below, in the same order as in Table 3. The reference thickness $t_{ref}$ was 2.0 mm. For parts formed to T4 temper and then undergoing bake hardening, protocols recommend that a pre-strain by controlled stretching of 10% between natural aging and paint baking should be carried out, to simulate forming by stamping. In the case of artificial aging treatment after natural aging according to the invention, this pre-strain has no significant effect on the tensile characteristics of the final component.

It can therefore be considered that the folding behavior of the sheets in the final temper is not significantly different from that of the finished stamped component.

TABLE 4

| Test number | Composition | Rp0.2 [MPa] | αnorm [°] |
|---|---|---|---|
| 1 | Invention 1 | 285 | 72 |
| 2 | Invention 1 | 263 | 98 |
| 3 | Invention 1 | 235 | 113 |
| 4 | Invention 2 | 287 | 109 |
| 5 | Invention 3 | 265 | 93 |
| 6 | Invention 4 | 312 | 98 |
| 7 | Invention 5 | 295 | 103 |
| 8 | Invention 6 | 275 | 99 |
| 9 | Alloy 7 | 249 | 70 |
| 10 | Alloy 7 | 218 | 93 |
| 11 | Alloy 8 | 249 | 91 |
| 12 | Alloy 8 | 238 | 99 |
| 13 | Alloy 9 | 268 | 61 |
| 14 | Alloy 9 | 209 | 103 |
| 14 | Alloy 10 | 290 | 75 |
| 16 | Alloy 10 | 239 | 91 |
| 17 | Invention 31 | 261 | 94 |

It is there clearly shown that only the compositions and the aging according to the invention, in bold, make it possible to reach the desired compromise, namely a tensile yield strength Rp0.2≥260 MPa, and a folding angle αnorm without crack ≥90°.

The invention claimed is:

1. A method of manufacturing a stamped body component or bodywork structure, or body in white made of aluminum alloy for absorbing energy irreversibly during an impact, comprising:
    manufacturing a sheet or strip of thickness between 1 and 3.5 mm of alloy with composition, comprising as a percentage by weight: Si: 0.60-0.85%; Fe: 0.05-0.25%; Cu: 0.05-0.30%; Mn: 0.05-0.30%; Mg: 0.50-1.00%; Ti: 0.02-0.15%; V: 0.00-0.15% other elements <0.05% each and <0.15% in total, the rest aluminum, with Mg<−2.67×Si+2.87%,
    solution heat treating, and quenching natural aging at room temperature, forming by press stamping, to obtain a three-dimensional part, aging the workpiece at a temperature of substantially 205° C. with a holding time of between 180 and 480 minutes, or time-temperature equivalent aging, and painting and bake hardening at a temperature of 150 to 190° C. for 15 to 30 min.

2. The method according to claim 1, wherein the holding time at 205° C. is between 240 and 480 minutes or at equivalent time-temperature.

3. The method according to claim 1, wherein the Si content of the sheet or strip is between 0.60% and 0.75%.

4. The method according to claim 1, wherein the Fe content of the sheet or strip is between 0.05% and 0.20%.

5. The method according to claim 1, wherein the Cu content of the sheet or strip is at most 0.20%.

6. The method according to claim 1 wherein the Mn content of the sheet or strip is between 0.10% and 0.15%.

7. The method according to claim 1, wherein the Mg content of the sheet or strip is between 0.60% and 0.70%.

8. The method according to claim 1, wherein the Ti content of the sheet or strip is between 0.03% and 0.10%.

9. The method according to claim 1 wherein the V content of the sheet or strip is between 0.05% and 0.10%.

10. The method according to claim 1 wherein the manufacturing of the sheet or strip before stamping comprises:

casting typically vertical semi-continuous casting of a rolling ingot and its scalping, homogenizing of this rolling ingot at a temperature of 530 to 570° C. with a holding between 2 and 12 hours, hot rolling of the rolling ingot into a strip of thickness between 3.5 and 10 mm, cold rolling down to final thickness.

11. A stamped bodywork component or automotive bodywork structure or body in white, produced by a method according to claim 1, wherein a tensile yield strength thereof, determined according to standard NF EN ISO 6892-1, is ≥260 MPa.

12. A stamped bodywork component or automotive bodywork structure, or body in white, produced by a method according to claim 1 wherein a three point folding angle αnorm thereof, determined according to standard NF EN ISO7438 and procedures VDA 238-100 and VDA 239-200, is at least 90°.

13. A stamped bodywork component or automotive bodywork structure or body in white, according to claim 11, which is chosen from the group comprising lining or reinforcement for a door, hood, trunk lid, roof, or spars, walls, load floors, tunnels and front, middle and rear feet or uprights, or shock absorbers or crashboxes.

14. The method according to claim 1, further comprising pre-aging at a temperature generally between 50 and 100° C. for a period of at least 12 hours after quenching and before natural aging.

15. The method according to claim 14, wherein the pre-aging is obtained by coiling at a temperature of at least 60° C. followed by cooling in the open air.

16. The method according to claim 1, wherein the painting and bake hardening is at a temperature of 170 to 190° C. for 15 to 30 min.

17. The method according to claim 10, wherein the homogenizing of the rolling ingot is at a temperature of 530 to 570° C. with a holding between 4 and 6 hours.

18. The method according to claim 1, wherein the time-temperature equivalent aging is according to the equation, $$\int_0^\tau \exp\left(\frac{-Q}{RT}\right)dt = \int_0^{\tau eq} \exp\left(\frac{-Q}{RTeq}\right)dt$$

where Q is substantially 82915 J, where T is the instantaneous temperature expressed in Kelvin which changes with time t, and $T_{eq}$ is the reference temperature of 205° C. (478 K), and teq is the equivalent time.

19. The method according to claim 1, wherein the Cu content of the sheet or strip is between 0.08% and 0.15%.

20. The method according to claim 1, wherein natural aging at room temperature is between 72 hours and 6 months.

* * * * *